(12) United States Patent
Verellen et al.

(10) Patent No.: US 12,066,372 B2
(45) Date of Patent: Aug. 20, 2024

(54) LIGHT EXCITATION AND COLLECTION DEVICE AND A METHOD FOR LIGHT EXCITATION AND COLLECTION

(71) Applicant: IMEC VZW, Leuven (BE)

(72) Inventors: Niels Verellen, Heverlee (BE); Pol Van Dorpe, Spalbeek (BE)

(73) Assignee: IMEC VZW, Leuven (BE)

( * ) Notice: Subject to any disclaimer, the term of this patent is extended or adjusted under 35 U.S.C. 154(b) by 1 day.

(21) Appl. No.: 17/544,300

(22) Filed: Dec. 7, 2021

(65) Prior Publication Data

US 2022/0178812 A1 Jun. 9, 2022

(30) Foreign Application Priority Data

Dec. 8, 2020 (EP) .................................... 20212506

(51) Int. Cl.
*G01N 15/1434* (2024.01)
*G01N 15/10* (2024.01)

(52) U.S. Cl.
CPC . *G01N 15/1434* (2013.01); *G01N 2015/1006* (2013.01)

(58) Field of Classification Search
None
See application file for complete search history.

(56) References Cited

U.S. PATENT DOCUMENTS 7,298,478 B2 11/2007 Gilbert et al.
9,757,726 B2 9/2017 Sharpe et al.
(Continued)

FOREIGN PATENT DOCUMENTS

CN 111889153 A 11/2020
WO WO-2016175859 A1 11/2016
(Continued)

OTHER PUBLICATIONS

Toshifumi Ohkubo et al., "Evaluation of fluorescence emitting characteristics of a microparticle by illumination angle scanning utilizing a resin-based monolithic TAS chip", Microsystem Technologies vol. 23, No. 11, pp. 5149-5162 (2016).
(Continued)

*Primary Examiner* — Rufus L Phillips
(74) *Attorney, Agent, or Firm* — MOSER TABOADA (57) ABSTRACT

According to an aspect of the present inventive concept there is provided a light excitation and collection device for a micro-fluidic system, comprising:
a light source configured to generate excitation light;
a plurality of excitation waveguides, each associated with a flow channel of the micro-fluidic system;
wherein each excitation waveguide is configured to receive and redirect the excitation light towards the flow channel, such that the excitation light is elastically scattered by a sample in the flow channel forming forward and side scattered light; and
wherein the light excitation and collection device further comprises:
at least one forward scattered light collection point; and
at least one side scattered light collection point; and
wherein the forward scattered light collected for all excitation waveguides is detected by a first plurality of light sensitive areas and the side scattered light collected for all excitation waveguides is detected by a second plurality of light sensitive areas, the first and the second pluralities of light sensitive areas form different groups of light sensitive areas.

11 Claims, 7 Drawing Sheets

(56) References Cited

U.S. PATENT DOCUMENTS

| | | | |
|---|---|---|---|
| 2011/0001963 A1 | 1/2011 | Durack | |
| 2011/0003330 A1 | 1/2011 | Durack | |
| 2012/0307244 A1 | 12/2012 | Sharpe et al. | |
| 2013/0288357 A1 | 10/2013 | Tiefenthaler | |
| 2017/0351034 A1* | 12/2017 | Vercruysse | .......... G03H 1/0443 |
| 2019/0154562 A1 | 5/2019 | Sharpe et al. | |

FOREIGN PATENT DOCUMENTS

| | | | |
|---|---|---|---|
| WO | WO-2017001609 A1 | 1/2017 | |
| WO | WO-2018054852 A1 | 3/2018 | |
| WO | WO-2019122092 A1 * | 6/2019 | ........ B01L 3/502707 |

OTHER PUBLICATIONS

Extended European Search Report in EP20212506.8 dated Jun. 8, 2021.

\* cited by examiner

LIGHT EXCITATION AND COLLECTION DEVICE AND A METHOD FOR LIGHT EXCITATION AND COLLECTION

CROSS-REFERENCE TO RELATED APPLICATIONS

This application claims benefit of EPC Application No. 20212506.8 filed on Dec. 8, 2020, which is herein incorporated by reference in its entirety.

TECHNICAL FIELD

The present inventive concept relates to a light excitation and collection device for micro-fluidic systems, and more specifically to sample detection by means of elastic scattering of light in micro-fluidic systems.

BACKGROUND

Micro-fluidics has found multi-disciplinary application involving biotechnology, biochemistry, engineering, physics and more. Micro-fluidics is practically used in a wide variety of applications ranging from inkjet printer head development and micro-propulsion to medical cell analysis. In such application optical diagnostics is typically employed for detecting, analyzing and sorting particles, droplets or cells.

One specific example from the field of biotechnology is cytometry, and in particular flow cytometry. Flow cytometry is a method of single-cell analysis that includes identification of a cell's morphological and/or chemical characteristics. Typically, a cell population is suspended in a clear saline solution, which is funneled through a nozzle that forges a single-cell stream, flowing past a light beam one cell at a time. Fluorescent markers are often used to label particular molecules, such as proteins, that can identify the cell from a chemical point of view. This approach commonly involves an optical system focusing laser light to excite the fluorescent marker, and collecting the subsequently emitted fluorescence from the cell. Morphology based cell identification uses characteristic light scattering properties of different cell types. Elastic light scattering may be improved by labeling the cells with micro or nanospheres. Cell identification based on elastically scattered light is feasible since the spatial distribution of elastically scattered light is dependent on the cell's size, shape, refraction index, density, and morphology.

One approach of identifying cells is by detecting the forward scattered light and the side scattered light, respectively. Forward scattered light is related to cell size whereas side scattered light is related to complexity or granularity of the cell. Detection of the scattered light is usually made by means of light sensitive detectors, such as photodiodes (PD) or photo-multiplier tubes (PMT).

An important drawback of the currently available systems is that they are limited in terms of throughput. The throughput is limited by two factors, the detection signal-to-noise ratio and the number of flow channels that can be read-out in parallel. Parameters affecting the signal-to-noise ratio, such as laser power, flow speed, and detector characteristics are normally already optimized in current systems. Therefore, in order to enable higher-throughput, the remaining option is to split the sample fluid into multiple parallel flow channels with associated excitation and detection channels.

However, when scaling up such a system to tens or hundreds of channels, the light excitation and collection becomes a bottleneck. Such upscaled systems are facing further drawbacks, such as being bulky, expensive, and sensitive to mechanical variations. Therefore, there is a need in the art for an improved light excitation and collection approach.

SUMMARY

An objective of the present inventive concept is to provide a light excitation and collection device for a micro-fluidic system, the light excitation and collection system providing excitation light for a plurality of flow channels in the micro-fluidic system, and collecting light for the plurality of channels, yet being a compact device despite the high number of flow channels.

These and other objectives are at least partly met by the invention as defined in the independent claims. Preferred embodiments are set out in the dependent claims.

The present inventive concept provides improved devices and methods for light excitation and collection in micro-fluidic applications, for processing of samples comprising particles (e.g., cytometry including microfluidic based sorters, drop sorters, and/or cell purification).

More particularly, the present inventive concept provides advantageous photonics integrated circuit optical detection and collection assemblies for particle (e.g., cells, microscopic particles, etc.) processing systems and methods (e.g., for analyzing, sorting, processing, purifying, measuring, isolating, detecting, monitoring and/or enriching particles), based on detection of forward and side scattering signals.

According to a first aspect of the present inventive concept there is provided a light excitation and collection device for a micro-fluidic system, comprising:

a light source configured to generate excitation light;

a plurality of excitation waveguides, wherein each excitation waveguide of the plurality of excitation waveguides is associated with a flow channel of a plurality of flow channels of the micro-fluidic system, and wherein the plurality of excitation waveguides are arranged in an excitation waveguide plane and the plurality of flow channels are arranged in a flow channel plane, the excitation waveguide plane and the flow channel plane being parallel;

wherein each excitation waveguide of the plurality of excitation waveguides is configured to receive the excitation light from the light source, to guide the excitation light in the excitation waveguide plane, and at an output of the excitation waveguide to redirect the excitation light towards the flow channel associated with the excitation waveguide, such that the excitation light is elastically scattered by a sample in the flow channel forming forward scattered light and side scattered light; and wherein the light excitation and collection device further comprises:

at least one forward scattered light collection point associated with each of the plurality of excitation waveguides, at which forward scattered light collection point at least part of the forward scattered light is collected; and at least one side scattered light collection point associated with each of the plurality of excitation waveguides, at which side scattered light collection point at least part of the side scattered light is collected; and wherein the forward scattered light collected at the forward scattered light collection point for all excitation waveguides of the plurality of excitation waveguides is detected by a first plurality of light sensitive areas and the side scattered light collected at the side scattered light collection point for all excitation waveguides of the plurality of excitation waveguides is detected by a second plurality of light sensitive areas, the first plurality of light sensitive areas and the second plurality of light sensitive areas form different groups of light sensitive areas.

By the term "micro-fluidic system" is here meant any fluid flow system comprising a plurality of flow channels with dimensions in the range from tens to hundreds of micrometers. The plurality of flow channels may be interconnected into a network through which a fluid may flow. By way of example, the micro-fluidic system may process the fluid in a variety of ways, such as transporting, mixing or separating the fluid. Given as non-limiting examples, a micro-fluidic system may be a flow cytometer, a droplet sorter or a cell sorter. The plurality of flow channels of the micro-fluidic system may have at least one transparent side through which optical diagnostics of the flow in the flow channel may be performed. By way of example, the at least one transparent side may be made of, but is not limited to, standard glass, BK7, quartz, or any other transparent solid material. Alternatively, the plurality of flow channels may have non-transparent sides. It is conceivable that one or more waveguides may be provided on one or more inner walls of the flow channel, providing optical access to and from the flow channel, hence allowing to guide light in and out of the flow channel.

By the term "light source" is here meant any unit, device and/or element at which light is generated. In this context the term "light" should be allowed a wider interpretation, not limited to visible electromagnetic radiation but may also include for example ultra-violet light and infra-red light. By way of example, the light source may be, but is not limited to a laser, a light emitting diode, an incandescent light source, a fluorescent light source, or a combination thereof.

By the term "waveguide" is here meant any unit, device and/or element within which light may be guided, and within which transmission is restricted to a single direction, thereby providing transmission with low loss. By way of example, light may be reflected on inner walls of the waveguide by total internal reflection or by means of a reflective coating provided on the walls of the waveguide. Given as non-limiting examples, the wave guide may be a transparent dielectric waveguide or an optical fiber.

At the output of the excitation waveguide the excitation light is redirected towards the flow channel associated with the excitation waveguide. By way of example, the redirection of excitation light may be achieved by a reflective coating, a grating coupler, or any other means of redirecting light. After redirection of the excitation light, the excitation light propagates into the flow channel and illuminates any sample in its propagation path. Upon illuminating a sample, the excitation light may be elastically scattered.

Further, it should be understood that the invention may be implemented by means of photonic integrated circuits (PICs) in order to realize the excitation waveguides.

By the term "elastic scattering" is here meant a light scattering process in which the direction of light may change but the energy of the photons, and thus the wavelength of the light is substantially unchanged, apart from a slight Doppler shift that may result from the movement of the sample. In other words, the scattering process does not involve any net energy transfer between the light and the scattering sample, in terms of e.g. change in electronic energy states of the atoms or molecules in the sample. Given as non-limiting examples, the elastic scattering may be, but is not limited to, Rayleigh, Thomson, Debye or Mie scattering.

By the term "forward scattered light" is here meant scattered light that has a scattering angle, with respect to the propagation direction of the excitation light, that is larger than 0° but not larger than 10°. More preferably, forward scattered light is light having a scattering angle in the range of 0.5° to 5°.

By the term "side scattered light" is here meant scattered light that has a scattering angle, with respect to the propagation direction of the excitation light, that is larger than 10° but not larger than 170°. More preferably, side scattered light is light having a scattering angle in the range of 15° to 150°.

By the term "collection point" is here meant a position at which scattered light is collected to be directed towards a detector, and wherein the scattered light reaching the collection point has desired properties. Thus, the forward scattered light collection point is arranged at a position which is reached by the forward scattered light, and in this manner spatially filtering the forward scattered light from other scattered light. In a similar manner, the side scattered light collection point is arranged at a position which is reached by the side scattered light, spatially filtering the side scattered light from other scattered light. By way of example, a light sensitive area configured to detect light may be arranged at or in close vicinity to the forward scattered light collection point and/or the side scattered light collection point, for directly detecting the light collected at the collection point. Given as another example, a light guiding arrangement, such as a waveguide, may be arranged at the forward scattering light collection point and/or the side scattering light collection point, so as to guide the collected light to a light sensitive area arranged at a position remote to the collection point.

By the term "light sensitive area" is here meant an area on a device configured to detect light impinging onto the area, by generating an electrical signal as a response to the light intensity. Given as non-limiting examples, light sensitive areas may be found on photodiodes, photo-multiplier tubes (PMT), and pixels on image sensors such as charge-coupled devices (CCD) and complementary metal oxide semiconductors (CMOS).

An advantage of the present inventive concept is that it allows for dense integration of the individual excitation waveguides and associated flow channels, enabling a compact solution of delivering excitation light to a large number (e.g. tens or hundreds) of parallel flow channels. Consequently, as the system is scaled up by splitting the sample into multiple parallel flow channels, a light excitation and collection device for a micro-fluidic system with higher throughput may be provided.

Another advantage of the present inventive concept is that it may allow for high mechanical stability between the excitation waveguides and the flow channels, thus enabling pre-alignment of fixed components. By the present arrangement, a light excitation and collection device for a micro-fluidic system, not requiring any alignment upon operation, thereby being easy for the user to operate, may be provided.

According to an embodiment, at least one of the first plurality of light sensitive areas and the second plurality of light sensitive areas may be arranged in a detector array.

By the term "detector array" is here meant any unit or device onto which a plurality of separate light sensitive areas are arranged such that they may individually detect the light intensity impinging onto the respective light sensitive areas, and in response thereof produce an electrical signal. The light sensitive areas on the detector array may be arranged along one or more rectilinear lines. By way of example, a detector array may be, but is not limited to, a charge-coupled device (CCD) and complementary metal oxide semiconductor (CMOS).

An advantage with this embodiment is that the light sensitive areas or pixels may be arranged very closely, thereby forming a very compact device for detection of light in a large number of positions. By arranging the detector array such that individual pixels are associated with individual flow channels, a compact detection arrangement for a large number of flow channels may be provided.

According to an embodiment, one or more excitation waveguides of the plurality of excitation waveguides may comprise an excitation grating coupler, and wherein the excitation grating coupler may be arranged to redirect the excitation light, at the output of the excitation waveguide, towards the flow channel associated with the excitation waveguide.

An advantage with this embodiment is that it may provide a compact and efficient manner of redirecting the excitation light from the excitation waveguide towards the flow channel.

Another advantage with this embodiment is that by selection of grating pitch or grating period for the excitation grating coupler, an angle under which the excitation light exits the grating coupler may be tuned. This may further improve spatial separation between the forward scattered light and the side scattered light. With the present arrangement high rejection of unwanted light scattering angles may be provided, which may further improve the signal-to-noise ratio of the detected light.

According to an embodiment, the detector array may be arranged on an opposite side of the flow channel, in relation to the excitation waveguide plane, such that a light sensitive area of the detector array is facing the flow channel.

By the present arrangement, each of the light sensitive areas may be arranged at a forward scattered light collection point and/or a side scattered light collection point. In this manner, the forward scattered light and/or the side scattered light from each of the plurality of flow channels may be detected directly at the respective collection point, and hence no further light guiding means is required for the collected light.

According to an embodiment, the light excitation and collection device may further comprise a plurality of collection waveguides, wherein each collection waveguide of the plurality of collection waveguides is associated with a flow channel of the plurality of flow channels of the microfluidic system, and wherein the plurality of collection waveguides may be arranged in a collection waveguide plane being parallel to the flow channel plane;

wherein each collection waveguide of the plurality of collection waveguides is configured to receive light collected at at least one of the forward scattered light collection point or the side scattered light collection point, to guide the collected light in the collection waveguide plane, and at an output of the collection waveguide direct the light towards the detector array.

An advantage with this embodiment is that the light detection may be carried out elsewhere, thereby allowing the collection points associated with different flow channels to be arranged closely. In the manner described above, a compact solution for light collection from a large number (e.g. tens or hundreds) of parallel flow channels may be provided.

Another advantage of this embodiment is that collection of light may be enabled very close to the sample, which minimizes the risk of cross-talk between adjacent flow channels caused by light from one flow channel reaching a light sensitive area associated with another flow channel. Consequently, improved signal-to-noise ratio (SNR) may be provided.

According to an embodiment, the output of the collection waveguide may be arranged at an edge of the collection waveguide, and wherein the detector array may be arranged at the edge of the collection waveguide to detect the light.

According to an embodiment, the excitation waveguide plane and the collection waveguide plane may be arranged on a common substrate to form an opto-fluidic device, the opto-fluidic device further comprising the plurality of flow channels, and wherein the light source and the detector array may be arranged externally to the opto-fluidic device.

Opto-fluidic devices comprising excitation waveguides and optionally comprising collection waveguides, may be manufactured using established semi-conductor technology. Given as a non-limiting example, the substrate may be made silicon based. At least part of the opto-fluidic device may be formed as a photonic integrated circuit (PIC). Manufacturing of this type may provide good control of the features and dense integration and pre-alignment of fixed components in a reproducible microchip manufacturing process. Such manufacturing may further allow co-integration with particle/cell sorting modules within the same process.

An advantage with this embodiment is that a particularly compact light excitation and collection device and microfluidic system combination may be provided.

Further, the opto-fluidic device may comprise only relatively inexpensive components as the light source and the detector array may be external to the opto-fluidic device. The opto-fluidic device may be designed for a particular use with a desired number of flow channels. The opto-fluidic device may even be disposable and only used in a single or a few measurement instances. In this regard, the arrangement of an opto-fluidic device that allows a high throughput by comprising a large number of flow channels, while enabling the light source and the detector array to be arranged externally to the opto-fluidic device is highly advantageous as it allows scaling the opto-fluidic device to a particular need in a measurement set-up while the opto-fluidic device may be a cheap, disposable component.

According to an embodiment, the excitation light from the light source may be distributed to different excitation waveguides by means of a plurality of beam splitters.

By the term "beam splitter" is here meant any unit, device and/or element configured to split a beam of light into at least two separate beam paths. Given as a non-limiting example, the beam splitters may be dichroic beam splitters. Given as another non-limiting example, the beam splitters may be 50/50 beam splitters, splitting the incoming light intensity into two paths, the light intensity in each of the two paths being 50% of the incoming light intensity.

An advantage of this embodiment is that a light splitting arrangement with low loss, splitting the light from the light source into a plurality of flow channels, may be provided.

According to an embodiment, the forward scattered light collection point may comprise a forward scattered collection grating coupler, and the forward scattered collection grating coupler may be arranged to redirect the forward scattered light such that the forward scattered light is guided in the collection waveguide plane in a direction towards the detector array.

According to an embodiment, the side scattered light collection point may comprise a side scattered collection grating coupler, and the side scattered collection grating coupler may be arranged to redirect the side scattered light such that the side scattered light is guided in the collection waveguide plane in a direction towards the detector array.

The forward scattered collection grating coupler and/or the side scattered collection grating coupler may be configured to couple the forward scattered light and the side scattered light, respectively, from the flow channel into the collection waveguide. The forward scattered collection grating coupler and/or the side scattered collection grating coupler may be configured to have a collection efficiency being dependent on an angle of incidence with which light impinges onto a surface of the flow channel at which the respective grating couplers are arranged. Hence, the collection gratings may collect light from only a predesigned range of angles of incidence, or combination of ranges thereof.

The forward scattered collection grating coupler and/or the side scattered collection grating coupler may be configured to have a collection efficiency being dependent on polarization of the incident light.

An advantage with this embodiment is that efficient separation of undesired scattering angles from desired scattering angles may be provided.

According to an embodiment, a blocking layer may be arranged in a surface facing the flow channel in locations other than the locations at which the forward scattered light collection point and the side scattered light collection point are located, such that the blocking layer blocks light impinging on the surface with an undesired angle of incidence.

By way of example, a blocking layer may be arranged along any of the side surfaces of the flow channel, and between the flow channel and the collection waveguide, to spatially block transmission of light from the flow channel to the collection waveguide. The blocking layer may be applied as a paint or coating, or as a solid object arranged between the flow channel and the collection waveguide. Given as non-limiting examples, the blocking layer may be of reflective type, absorbing type, or a combination thereof. At the forward scattered light collection point and/or the side scattered light collection point there may be provided gaps or holes in the blocking layer such that light that impinges only onto the forward scattered light collection point and/or the side scattered light collection point may be transmitted and thereafter coupled into the collection waveguide. Given as another non-limiting example, the blocking layer may be an interference filter configured to have low reflectance for a range of angle of incidence corresponding to the forward scattered light and/or the side scattered light. Further, the interference filter may be configured to have high reflectance for angles of incidence not corresponding to the forward scattered light and/or the side scattered light. By the present arrangement, contrary to providing gaps in the blocking layer for transmission, an angle-based filtering through the blocking layer may be provided.

An advantage with this embodiment is that efficient separation of undesired scattering angles from desired scattering angles may be provided.

According to an embodiment, an interference filter may be arranged in a surface facing the flow channel, such that the interference filter selectively reflects, towards at least one of the forward scattered light collection point or the side scattered light collection point, light impinging on the surface with a desired angle of incidence.

The interference filter may be configured to have high reflectance for the range of angle of incidence corresponding to the forward scattered light and/or the side scattered light. Further, the interference filter may be configured to have low reflectance for angles of incidence not corresponding to the forward scattered light and/or the side scattered light. By way of example, the interference filter may be arranged at a first side of the flow channel and the forward scattered light collection point and/or the side scattered light collection point may be arranged at a second side of the flow channel, the second side of the flow channel being opposite to the first side of the flow channel. In the present manner, forward scattered light may be reflected by the interference filter at the first side of the flow channel and redirected towards the forward scattered light collection point at the second side of the flow channel. At the forward scattered light collection point, the forward scattered light is coupled into the collection wave guide. Side scattered light may be reflected by the interference filter at the first side of the flow channel and redirected towards the side scattered light collection point at the second side of the flow channel. At the side scattered light collection point, the side scattered light is coupled into the collection wave guide. Light with other angles of incidence than those corresponding to forward scattered light or side scattered light will not be reflected by the interference filter and thus will not be coupled into the collection wave guide. By way of example, light with other angles of incidence may instead be absorbed by the interference filter, or may be transmitted, or may be diffusely scattered off the interference filter.

An advantage with this embodiment is that efficient separation of undesired scattering angles from desired scattering angles may be provided.

According to an embodiment, the first plurality of light sensitive areas and the second plurality of light sensitive areas may be arranged in a detector array.

An advantage with this embodiment is that detection of both the forward scattered light and the side scattered light may be arranged in a compact manner such that an even more compact light excitation and collection device may be provided.

According to an embodiment, a light excitation and collection assembly for a micro-fluidic system, may comprise two or more of the light excitation and collection devices.

An advantage with this embodiment is that light from a single light source may not be split up onto a too large number of flow channels. The two or more of the light excitation and collection devices may each comprise a light source configured to illuminate a limited number of all flow channels in the micro-fluidic system so that the light intensity in each channel is ensured to be high enough for providing a good signal-to-noise ratio.

Further, production of light excitation and collection systems may have limitation in terms of size and/or the number of channels that can be provided. Thus, another advantage with this embodiment is that combining a number of smaller sets of light excitation and collection systems may overcome such limitations of the number of flow channels. By the present arrangement, a light excitation and collection system which is less costly to produce may be provided.

According to an embodiment, a micro-fluidic system may be provided comprising at least one light excitation and collection device.

According to an embodiment, a flow cytometer may be provided comprising at least one light excitation and collection device.

According to a second aspect of the present inventive concept there is provided a method for light excitation and collection for a micro-fluidic system, the method comprising:

generating excitation light with a light source;
receiving the excitation light from the light source at each of a plurality of excitation waveguides, wherein each excitation waveguide of the plurality of excitation waveguides is associated with a flow channel of a plurality of flow channels of the micro-fluidic system, and wherein the plurality of excitation waveguides are arranged in an excitation waveguide plane and the plurality of flow channels are arranged in a flow channel plane, the excitation waveguide plane and the flow channel plane being parallel;
guiding the excitation light in the excitation waveguide plane;
redirecting, at an output of the excitation waveguide, the excitation light towards the flow channel associated with the excitation waveguide, such that the excitation light is elastically scattered by a sample in the flow channel forming forward scattered light and side scattered light;
collecting at least part of the forward scattered light, at at least one forward scattered light collection point associated with each of the plurality of excitation waveguides;
collecting at least part of the side scattered light, at at least one side scattered light collection point associated with each of the plurality of excitation waveguides;
detecting, by a first plurality of light sensitive areas, the forward scattered light collected at the forward scattered light collection point for all excitation waveguides of the plurality of excitation waveguides;
detecting, by a second plurality of light sensitive areas, the side scattered light collected at the side scattered light collection point for all excitation waveguides of the plurality of excitation waveguides;
wherein the first plurality of light sensitive areas and the second plurality of light sensitive areas form different groups of light sensitive areas.

Effects and features of the second aspect are largely analogous to those described above in connection with the first aspect. Embodiments mentioned in relation to the first aspect are largely compatible with the second aspect. It is further noted that the inventive concepts relate to all possible combinations of features unless explicitly stated otherwise.

Other objectives, features and advantages of the present inventive concept will appear from the following detailed disclosure, from the attached claims as well as from the drawings.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present inventive concept are described thereinafter according to a preferable embodiment, being not used to limit the claimed scope. This inventive concept may be embodied in many different forms and should not be construed as limited to the embodiments set forth herein; rather, these embodiments are provided for thoroughness and completeness, and fully convey the scope of the inventive concept to the skilled person.

Figure 1:
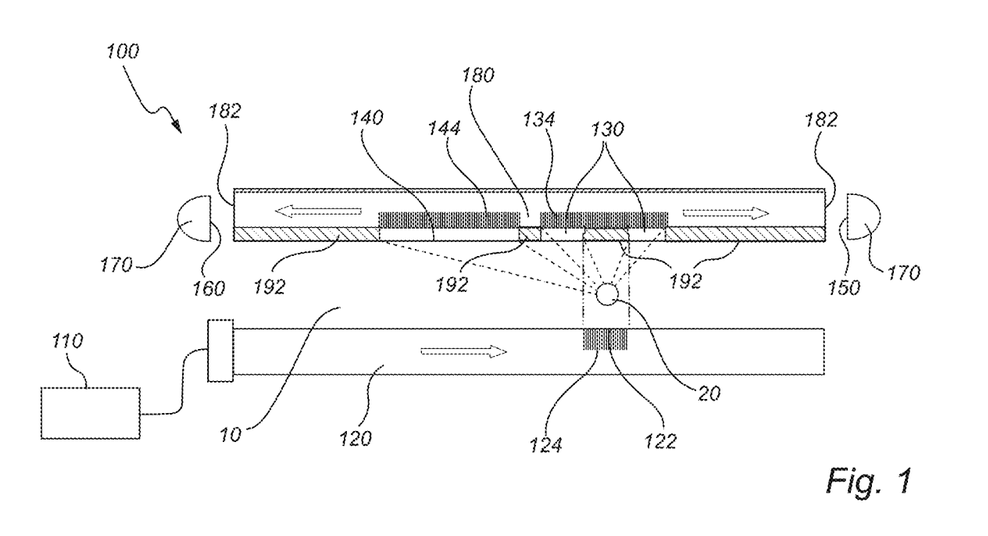
FIG. 1 illustrates the working principle of a light excitation and collection system for a micro-fluidic system.

FIG. 1 illustrates the working principle of a light excitation and collection system 100 for a micro-fluidic system. A cross-sectional side view of a single flow channel 10 of the micro-fluidic system is illustrated together with the components of the light excitation and collection device 100 associated with the flow channel 10.

A light source 110 configured to generate excitation light is optically connected to an end of an excitation waveguide 120. The excitation waveguide 120 is arranged to extend along a side of the flow channel 10, in an excitation waveguide plane parallel to a flow channel plane. The excitation light generated at the light source 110 is coupled into the end of the excitation waveguide 120 and propagates inside the excitation waveguide 120 in the excitation waveguide plane, towards an output 122 of the excitation waveguide 120. At the output 122 of the excitation waveguide 120 an excitation grating coupler 124 is arranged, which redirects the excitation light towards the flow channel 10. In the present embodiment, the excitation light leaves the excitation waveguide 120 at the output 122 and crosses the flow channel 10 perpendicular to the flow channel plane. However, the excitation light may alternatively cross the flow channel in a direction which is not perpendicular to the flow channel plane.

In the flow channel 10 a sample 20 is transported by the fluid in the flow channel 10. Once the sample 20 reaches the position at which the excitation light crosses the flow channel 10, the excitation light is elastically scattered by the sample 20, forming forward scattered light and side scattered light. At least part of the scattered light reaches a side of the flow channel 10 opposite to that at which the excitation waveguide 120 is arranged. At this opposite side a collection waveguide 180 is arranged, associated with the flow channel 10. The collection waveguide 180 is arranged in a collection wave guide plane being parallel to the flow channel plane.

At the border between the flow channel 10 and the collection waveguide 180 a blocking layer 192 is arranged, preventing light from the flow channel 10 to enter the collection waveguide 180. In the blocking layer 192 there are provided a number of openings, so that scattered light from the flow channel 10 reaching the openings may enter the collection waveguide 180.

Openings in the blocking layer are provided at two forward scattered light collection points 130. It should be noted that, although the number of forward scattered light collection points 130 are two in the present embodiment, it is conceivable that other embodiments may have fewer or more forward scattered light collections points 130. It should be noted that alternatively the two forward scattered light collection points 130 may be connected with each other so as to form a ring around direction of unscattered excitation light, such that forward scattered light may be collected along the ring. In an alternative embodiment, the side scattered collection point 140 may be provided in the shape of a ring, analogous to the ring for forward scattered light collection just described. Given as non-limiting examples, such rings may have a circular or elliptical shape.

At the forward scattered light collections points 130 the collection waveguide 180 may receive the forward scattered light from the flow channel 10. The collection waveguide 180 is provided with a forward scattered collection grating coupler 134 at the forward scattered light collection points 130. The forward scattered collection grating coupler 134 couples the forward scattered light into the collection waveguide 180 and redirects the forward scattered light towards a detector array 170 comprising a first plurality of light sensitive areas 150. The forward scattered light exits the collection waveguide 180 at an exit 182. The light sensitive area 150 on the detector array 170 is configured to detect the light intensity impinging onto the light sensitive area 150.

Openings in the blocking layer are provided also at a side scattered light collection point 140. It should be noted that, although the number of side scattered light collections points 140 is one in the present embodiment, it is conceivable that other embodiments may have more side scattered light collections points 140. At the side scattered light collections point 140 the collection waveguide 180 may receive the side scattered light from the flow channel 10. The collection waveguide 180 is provided with a side scattered collection grating coupler 144 at the side scattered light collection point 140. The side scattered collection grating coupler 144 couples the side scattered light into the collection waveguide 180 and redirects the side scattered light towards another detector array 170 comprising a second plurality of light sensitive areas 160. The side scattered light exits the collection waveguide 180 at an exit 182. The light sensitive area 160 on the detector array 170 is configured to detect the light intensity impinging onto the light sensitive area 160.

Although the present embodiment 100 comprises a combination of a blocking layer 192 and grating couplers 134, 144, it is equally conceivable to a person skilled in the art that other embodiments may comprise only a blocking layer or only grating couplers. Further, it is also conceivable that yet other embodiments may comprise a combination of a blocking layer and only a forward scattered grating coupler or only a side scattered grating coupler.

As previously mentioned, FIG. 1 illustrates the cross-section of a single flow channel 10 and the associated waveguides 120, 180. However, it should be understood that the micro-fluidic system may comprise a plurality of flow channels 10 arranged in parallel, side by side in a direction perpendicular to the plane of the drawing in FIG. 1. All flow channels 10 of the micro-fluidic system may be provided with the same components as just described for a single flow channel 10, wherein all the component associated with all the flow channels 10 are comprised in the excitation and collection device 100. In this regard, each collection waveguide 180 may be associated with light sensitive area 150, 160 for detecting the light collected in the collection waveguide 180, such that collection waveguides 180 associated with different flow channels may be associated with different light sensitive areas 150, 160 making up the detector array 170.

It should be understood that, although the present embodiment is described with two separate detector arrays, one for detection of forward scattered light and one for detection of side scattered light, it is conceivable to a person skilled in the art that alternative embodiments may comprise only one detector array, detecting either forward scattered light or side scattered light. Further, it is conceivable that alternative embodiments may comprise a single detector array comprising both the first and the second plurality of light sensitive areas 150, 160, such that both forward and side scattered light is detected by the same detector array.

It is conceivable to a person skilled in the art that the collection waveguide 180 for the forward scattered light and the collection waveguide 180 for the side scattered light may be two separate waveguides extending in the collection waveguide plane parallel to each other. In embodiments comprising two separate waveguides, the two waveguides may be arranged either in two separate sub-planes within the collection waveguide plane, or within the same plane. Further, it is conceivable to a person skilled in the art that the collection waveguide 180 for the forward scattered light and the collection waveguide 180 for the side scattered light may be the same waveguide 180.

Figure 3:
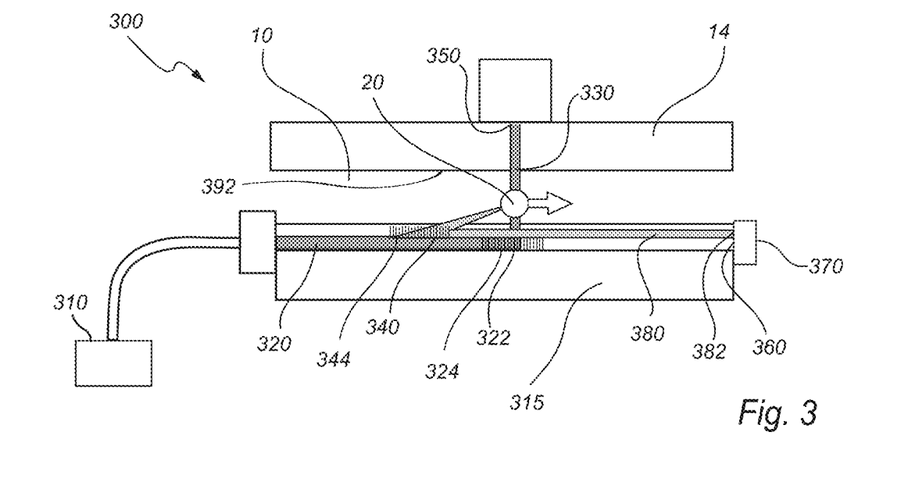
FIG. 3 illustrates a cross-sectional side view of components of another light excitation and collection device associated with a flow channel of a plurality of flow channels of a micro-fluidic system.
Figure 4:
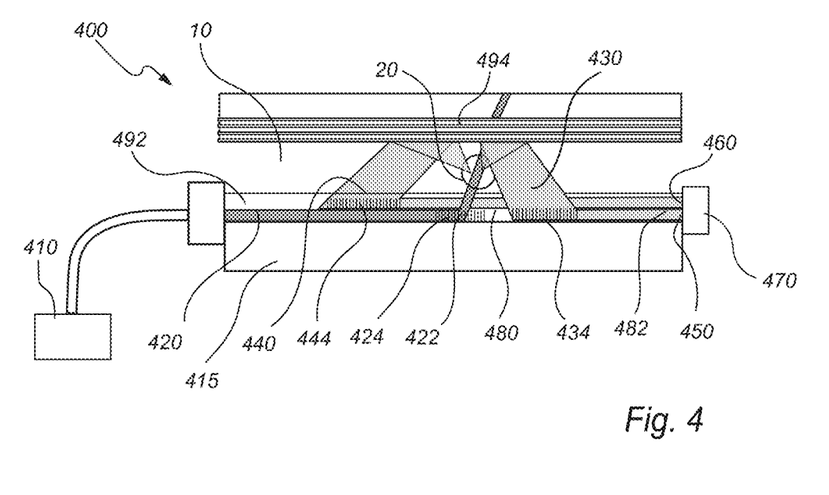
FIG. 4 illustrates a cross-sectional side view of components of yet another light excitation and collection device associated with a flow channel of a plurality of flow channels of a micro-fluidic system.

In FIG. 1 the details of the light excitation and collection device 100 for a flow channel 10 is illustrated in detail. In other embodiments, some of the components may be distributed differently, or may be replaced by other components, or may be lacking from the excitation and collection device. Therefore, the different embodiments illustrated in FIGS. 2-4 show some variations in positioning of components, but do not repeat all the details already illustrated in FIG. 1.

Figure 2:
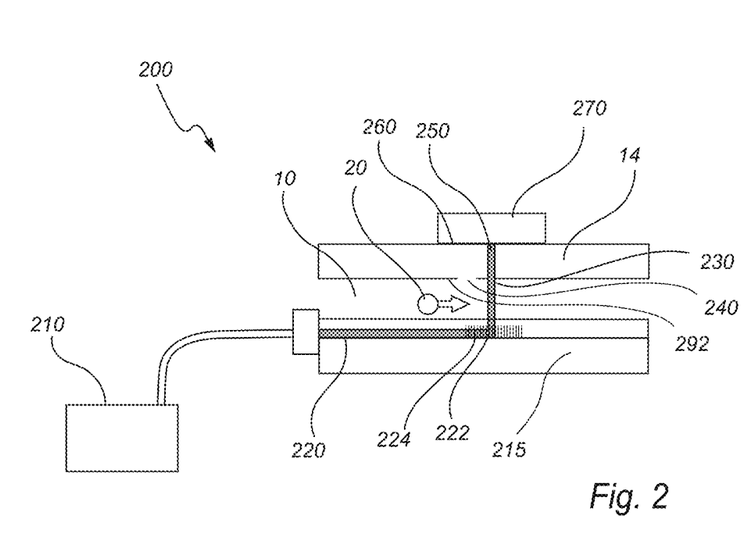
FIG. 2 illustrates a cross-sectional side view of components of a light excitation and collection device associated with a flow channel of a plurality of flow channels of a micro-fluidic system.

FIG. 2 illustrates a cross-sectional side view of components of a light excitation and collection device 200 associated with a flow channel 10 of a plurality of flow channels 10 of a micro-fluidic system.

A light source 210 provides excitation light to an excitation waveguide 220. The excitation waveguide 220 is arranged along a side of the flow channel 10, in an excitation waveguide plane parallel to a flow channel plane. At an output 222 of the excitation waveguide 220 an excitation grating coupler 224 is arranged, which redirects the excitation light towards the flow channel 10.

A sample 20 in the flow channel 10 may be transported through the excitation light crossing the flow channel 10, upon which the excitation light is elastically scattered forming forward and side scattered light. At least part of the scattered light reaches a side of the flow channel 10 opposite to that at which the excitation waveguide 220 is arranged.

At said opposite side of the flow channel 10 a blocking layer 292 is arranged on the inside of the top layer 14 of the flow channel 10, preventing light from exiting the flow channel 10. In the blocking layer 292 an opening is provided at a forward scattered light collection point 230, so that forward scattered light from the flow channel 10 reaching the forward scattered light collection point 230 may exit the flow channel 10. A detector array 270 is arranged on the opposite side of the flow channel 10, in relation to the excitation waveguide plane, such that a light sensitive area 250 of the first plurality of light sensitive areas 250 is facing the flow channel 10, and positioned such that forward scattered light exiting the flow channel 10 at the forward scattered light collection point 230 impinges on the light sensitive area 250. Given as a non-limiting example, the forward scattered light may impinge on the light sensitive area 250 by travelling across the top layer 10 from the forward scattered light collection point 230 directly to the light sensitive area 250. Given as another non-limiting example, a microlens array may be provided so as to relay the forward scattered light from the top layer 14 onto the light sensitive areas 250 of the detector array 270.

It should be noted that unscattered excitation light, following the same direction all the way across the flow channel 10, is blocked by the blocking layer 292, and does therefore not reach the light sensitive areas 250. Thus, as previously stated, the forward scattered light has a direction that deviates from the direction of the unscattered light. Although the blocking layer 292 in the present embodiment is arranged on the inside of the top layer 14, it is conceivable that in other embodiments the blocking layer 292 may be arranged on the outside of the top layer 14.

In the blocking layer 292 an opening is provided at a side scattered light collection point 240, so that side scattered light from the flow channel 10 reaching the side scattered light collection point 240 may exit the flow channel 10. A detector array 270 is arranged on the opposite side of the flow channel 10, in relation to the excitation waveguide plane, such that a light sensitive area 260 of a second plurality of light sensitive areas 260 is facing the flow channel 10, and positioned such that side scattered light exiting the flow channel 10 at the side scattered light collection point 240 impinges on the light sensitive area 260. Given as a non-limiting example, the side scattered light may impinge on the light sensitive area 260 by travelling across the top layer 10 from the side scattered light collection point 240 directly to the light sensitive area 260. Given as another non-limiting example, a microlens array may be provided so as to relay the side scattered light from the top layer 14 onto the light sensitive areas 260 of the detector array 270.

As is clear from the above, the present embodiment comprises a detector array 270 comprising the first plurality of light sensitive areas 250 and the second plurality of light sensitive areas 260. More precisely, the first plurality of light sensitive areas 250 are arranged along a rectilinear line on the detector array 270, and the second plurality of light sensitive areas 260 are arranged along another rectilinear line parallel to the first line. The detector array 270 is further arranged across the flow channels 10 of the micro-fluidic system, so that each light sensitive area 250 may receive forward scattered light from a flow channel 10, and so that each light sensitive area 260 may receive side scattered light from a flow channel 10. In alternative embodiments, the first plurality of light sensitive areas 250 may be arranged on one detector array 270 and the second plurality of light sensitive areas 260 may be arranged on another detector array 270, being separate from the first one.

The plurality of excitation waveguides 220 in the excitation waveguide plane and the plurality of flow channels 10 of the micro-fluidic system, and the corresponding top layers 14 thereof, are arranged on a common substrate 215 to form an opto-fluidic device. The light source 210 and the detector array 270 are arranged externally to the opto-fluidic device. By the present arrangement, the opto-fluidic device may be replaceable with another opto-fluidic device such that the same light source 210 and detector array 270 may be used in combination with a number of opto-fluidic devices.

FIG. 3 illustrates a cross-sectional side view of components of a light excitation and collection device 300 associated with a flow channel 10 of a plurality of flow channels 10 of a micro-fluidic system.

A light source 310 provides excitation light to an excitation waveguide 320. The excitation waveguide 320 is arranged along a side of the flow channel 10, in an excitation waveguide plane parallel to a flow channel plane. At an output 322 of the excitation waveguide 320 an excitation grating coupler 324 is arranged, which redirects the excitation light towards the flow channel 10.

When the excitation light crossing the flow channel 10 illuminates a passing sample 20 the excitation light is elastically scattered forming forward and side scattered light.

At a side of the flow channel 10 opposite to that at which the excitation waveguide 320 is arranged a blocking layer 392 is arranged on the inside of the top layer 14 of the flow channel 10, preventing light from exiting the flow channel 10. In the blocking layer 392 an opening is provided at a forward scattered light collection point 330, so that forward scattered light from the flow channel 10 reaching the forward scattered light collection point 330 may exit the flow channel 10. A light sensitive area 350 of a first plurality of light sensitive areas 350 is arranged on the opposite side of the flow channel 10, such that a light sensitive area 350 of the first plurality of light sensitive areas 350 is facing the flow channel 10, and positioned such that forward scattered light exiting the flow channel 10 at the forward scattered light collection point 330 impinges on the light sensitive area 350.

The light sensitive area 350 may be arranged on an individual detector unit for each of the flow channels 10. By way of example, such a detector unit may be a photodiode or a photo-multiplier tube (PMT). In the case of individual detector units, and in case the number of flow channels 10 in the micro-fluidic system is large, the number of individual detector units may need to be equally large, in order to detect forward scattered light from all flow channels 10 in the system. Alternatively, the first plurality of light sensitive areas 350 may be arranged on a detector array, providing a more compact solution for light detection.

Given as a non-limiting example, the forward scattered light may impinge on the light sensitive area 350 by travelling across the top layer 10 from the forward scattered light collection point 330 directly to the light sensitive area 350. Given as another non-limiting example, a microlens array may be provided so as to relay the forward scattered light from the top layer 14 onto the light sensitive areas 350.

Although the blocking layer 392 in the present embodiment is arranged on the inside of the top layer 14, it is conceivable that in other embodiments the blocking layer 392 may be arranged on the outside of the top layer 14.

At the same side of the flow channel 10 as the excitation waveguide 320 is arranged, also a collection waveguide 380 is arranged. At a side scattered light collections point 340 the collection waveguide 380 may receive the side scattered light from the flow channel 10. The collection waveguide 380 is provided with a side scattered collection grating coupler 344 at the side scattered light collection point 340.

The side scattered collection grating coupler 344 couples the side scattered light into the collection waveguide 380 and redirects the side scattered light towards another detector array 370 comprising a second plurality of light sensitive areas 360. The side scattered light exits the collection waveguide 380 at an exit 382. The light sensitive area 360 on the detector array 370 is configured to detect the light intensity impinging onto the light sensitive area 360.

The collection waveguide 380 in the present embodiment is another waveguide than the excitation waveguide 320. The collection waveguide 380 and the excitation waveguide 320 extend parallel to each other in a common plane, this plane being parallel to the flow channel plane. In other words, the excitation waveguide plane and the collection waveguide plane are the same plane. However, it is conceivable to a person skilled in the art that the excitation waveguide 320 and the collection waveguide 380 may be the same waveguide being used for both the excitation light and the collected scattered light.

It is further conceivable that the excitation waveguide 320 and the collection waveguide 380 are instead arranged in two separate planes. In embodiments comprising separate excitation and collection wave guide planes, the planes may extend parallel to each other.

It is further conceivable that the forward scattered light and the side scattered light are collected and guided in two separate collection waveguides. In embodiments comprising two separate collection waveguides, the two collection waveguides may be arranged either in two separate sub-planes within the collection waveguide plane, or within the same plane.

It should be understood that embodiments comprising separate waveguides, may it be an excitation waveguide separate from a collection waveguide or two separate collection waveguides or a combination thereof, allow for more flexibility in terms of waveguide properties. By way of example, such embodiments allow the different waveguides to be made of different waveguide materials. It may further allow the different waveguides to be made of different thicknesses. Such and other differences in waveguide properties may provide waveguides with improved performance. By way of example, waveguides with improved collection efficiency may be provided.

The plurality of excitation waveguides 320 in the excitation waveguide plane, the plurality of collection waveguides 380 in the collection waveguide plane, and the plurality of flow channels 10 of the micro-fluidic system, and the corresponding top layers 14 thereof, are arranged on a common substrate 315 to form an opto-fluidic device. The light source 310 and the detector array 370 are arranged externally to the opto-fluidic device. By the present arrangement, the opto-fluidic device may the replaceable with another opto-fluidic device such that the same light source 310 and detector array 370 may be used in combination with a number of opto-fluidic devices.

FIG. 4 illustrates a cross-sectional side view of components of a light excitation and collection device 400 associated with a flow channel 10 of a plurality of flow channels 10 of a micro-fluidic system.

A light source 410 provides excitation light to an excitation waveguide 420. The excitation waveguide 420 is arranged along a side of the flow channel 10, in an excitation waveguide plane parallel to a flow channel plane. At an output 422 of the excitation waveguide 420 an excitation grating coupler 424 is arranged, which redirects the excitation light towards the flow channel 10.

When the excitation light crossing the flow channel 10 illuminates a passing sample 20 the excitation light is elastically scattered forming forward and side scattered light.

At a side of the flow channel 10 opposite to that at which the excitation waveguide 420 is arranged an interference filter 494 is arranged. The interference filter 494 is configured to have high reflectance for the ranges of angle of incidence corresponding to the forward scattered light and the side scattered light and low reflectance for angles of incidence others than those for the forward and side scattered light. By the present arrangement, the forward scattered light is reflected by the interference filter 494 back towards the side of the flow channel 10 at which the excitation waveguide 420 is arranged. At this side of the flow channel 10, also a collection waveguide 480 is arranged.

The collection waveguide 480 is provided with a forward scattered collection grating coupler 434 at the forward scattered light collection point 430. The forward scattered collection grating coupler 434 couples the forward scattered light into the collection waveguide 480 and redirects the side scattered light towards a detector array 470 comprising a first plurality of light sensitive areas 450. The forward scattered light exits the collection waveguide 480 at an exit 482. The light sensitive area 450 on the detector array 470 is configured to detect the light intensity impinging onto the light sensitive area 450.

The collection waveguide 480 is further provided with a side scattered collection grating coupler 444 at the side scattered light collection point 440. The side scattered collection grating coupler 444 couples the side scattered light into the collection waveguide 480 and redirects the side scattered light towards the detector array 470 which further comprises a second plurality of light sensitive areas 460. The side scattered light exits the collection waveguide 480 at an exit 482. The light sensitive area 460 on the detector array 470 is configured to detect the light intensity impinging onto the light sensitive area 460.

The collection waveguide 480 in the present embodiment is common for the forward scattered light and the side scattered light. However, it is conceivable to a person skilled in the art that the collection waveguide for the forward scattered light and the collection waveguide for the side scattered light may be two separate waveguides.

The plurality of excitation waveguides 420 in the excitation waveguide plane, the plurality of collection waveguides 480 in the collection waveguide plane, and the plurality of flow channels 10 of the micro-fluidic system are arranged on a common substrate 415 to form an opto-fluidic device. The light source 410 and the detector array 470 are arranged externally to the opto-fluidic device. By the present arrangement, the opto-fluidic device may the replaceable with another opto-fluidic device such that the same light source 410 and detector array 470 may be used in combination with a number of opto-fluidic devices.

Figure 5A:
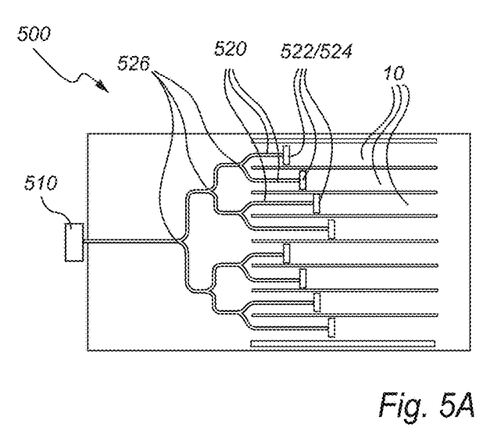
FIG. 5A illustrates a bottom view of eight flow channels of a micro-fluidic system together with a light excitation and collection device.

FIG. 5A illustrates a bottom view of eight flow channels 10 of a micro-fluidic system together with a light excitation and collection device 500.

A light source is arranged at one edge of the flow channel arrangement. Excitation light from the light source 510 is distributed to the excitation waveguides 520 associated with the individual flow channels 10 by means of 50/50 beam splitters 526 splitting the incoming light intensity into two paths, the light intensity in each of the two paths being 50% of the incoming light intensity. In the present embodiment the excitation light is distributed to the eight flow channels 10 by the excitation waveguide and beam splitter tree arrangement on the bottom side of the flow channel arrangement. Excitation light in the excitation waveguides 520 propagate in the excitation waveguide plane parallel to the flow channel plane. At an output 522 at each of the excitation waveguides 520, an excitation grating coupler 524 is provided, redirecting the excitation light towards the flow channels 10 such that the excitation light enters the flow channels 10 and crosses the flow channel plane.

Figure 5B:
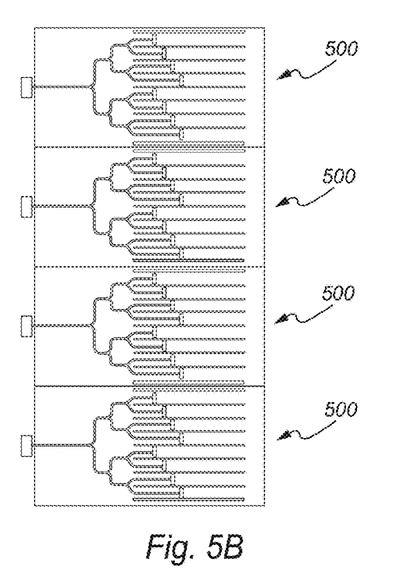
FIG. 5B illustrates a light excitation and collection assembly comprising a plurality of light excitation and collection devices.
Figure 5C:
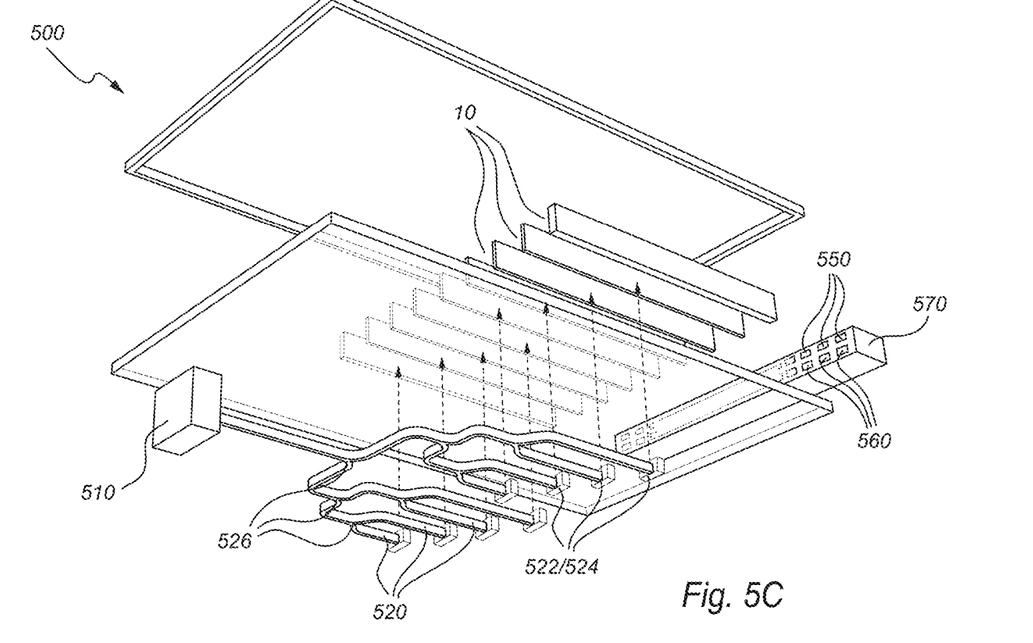
FIG. 5C illustrates an exploded view of the eight flow channels of a micro-fluidic system together with a light excitation and collection device.

FIG. 5C illustrates an exploded view of the eight flow channels 10 of a micro-fluidic system together with a light excitation and collection device 500, also shown in FIG. 5A. Further, a detector array 570 is illustrated to be arranged at an edge of the flow channel arrangement opposite to the edge at which the light source 510 is arranged. The detector array 570 comprises a first plurality of light sensitive areas 550 arranged in a rectilinear line, and a second plurality of light sensitive areas 560 arranged in another rectilinear line, such that the two lines are parallel. The detector array is positioned such that the light sensitive areas 550, 560 are facing the outputs 582 of the collection waveguides 580 (not shown in FIG. 5). By the present arrangement, the first plurality of light sensitive areas 550 may detect forward scattered light, and the second plurality of light sensitive areas 560 may detect side scattered light. Although the first plurality of light sensitive areas 550 and the second plurality of light sensitive areas 560 are arranged on two separate, parallel lines in the present embodiment, it is conceivable that the first plurality of light sensitive areas 550 and the second plurality of light sensitive areas 560 may be distributed differently in other embodiments. By way of example, the first plurality of light sensitive areas 550 and the second plurality of light sensitive areas 560 may be alternatingly arranged along a single rectilinear line such that every other light sensitive area in the line belongs to the first plurality of light sensitive areas 550, and the other light sensitive areas belong to the second plurality of light sensitive areas 560.

FIG. 5B illustrates a light excitation and collection assembly comprising a plurality of light excitation and collection devices 500. Thus, for micro-fluidic systems with a large number of flow channels 10 it may be advantageous to combine a plurality of light excitation and collection devices 500 into a larger assembly in order to provide light excitation and collection for all flow channels 10. It should be understood that, although the combination into a larger assembly is illustrated for the light excitation and collection device 500, it is conceivable to a person skilled in the art that also other embodiments allow such combination.

Figure 6A:
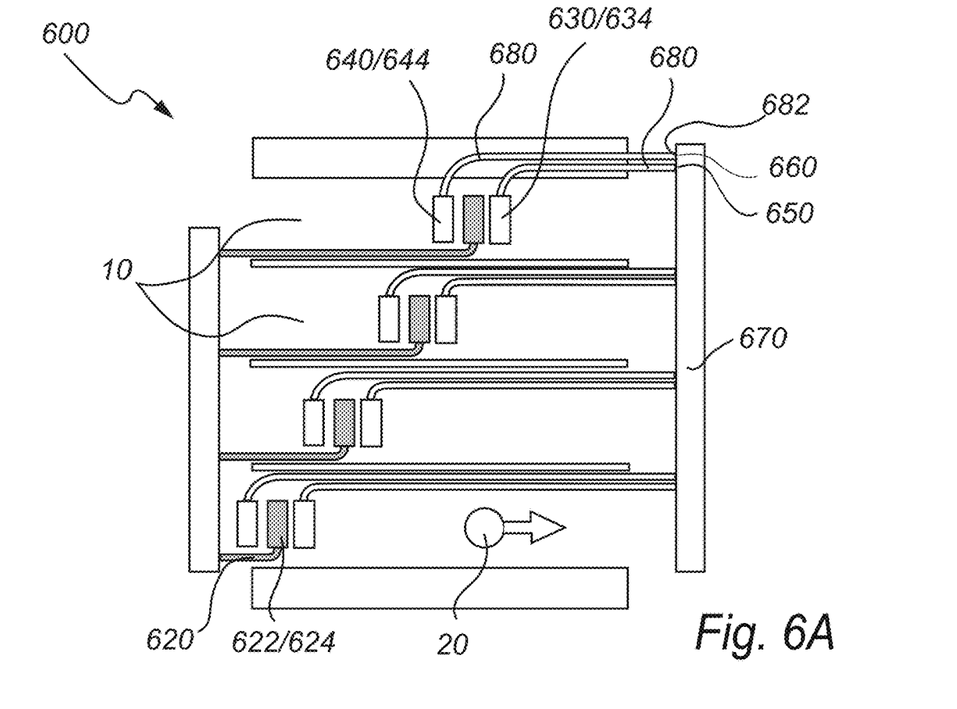
FIG. 6A schematically illustrates a top view of four flow channels of a micro-fluidic system together with a light excitation and collection device.

FIG. 6A schematically illustrates a top view of four flow channels 10 of a micro-fluidic system together with a light excitation and collection device 600.

Excitation light from the light source (not shown) propagates in the excitation waveguides 620 on the bottom side of the flow channel arrangement, in the excitation waveguide plane parallel to the flow channel plane. For all flow channels 10, an excitation grating coupler 624, at an output 622 of the excitation waveguide 620, redirects the excitation light towards the flow channel 10 such that the excitation light crosses the flow channel 10. When the excitation light crossing the flow channel 10 illuminates a passing sample 20 the excitation light is elastically scattered forming forward and side scattered light.

On the top side of the flow channel arrangement, parallel to the flow channel plane, a plurality of collection waveguides 680 are arranged. Each flow channel 10 has two collection waveguides 680 associated with the flow channel 10. As will be clear from the below, one collection waveguide 680 associated with each flow channel 10 is dedicated to handle forward scattered light, and the other collection waveguide 680 associated with each flow channel 10 is dedicated to handle side scattered light.

At a forward scattered light collection point 630, a forward scattered collection grating coupler 634 is arranged at one of the collection waveguides 680. Forward scattered light is thus coupled into the collection waveguide 680 and guided by the collection waveguide 680 to an output 682 of the collection waveguide 680. A detector array 670 is arranged at an edge of the flow channel arrangement. The detector array 670 comprises a first plurality of light sensitive areas 650 arranged to receive and detect forward scattered light from the output 682 of the collection waveguide for each of the flow channels 10.

At a side scattered light collection point 640, a side scattered collection grating coupler 644 is arranged at one of the collection waveguides 680. Side scattered light is thus coupled into the collection waveguide 680 and guided by the collection waveguide 680 to an output 682 of the collection waveguide 680. The detector array 670 arranged at an edge of the flow channel arrangement further comprises a second plurality of light sensitive areas 660 arranged to receive and detect side scattered light from the output 682 of the collection waveguide for each of the flow channels 10.

Figure 6B:
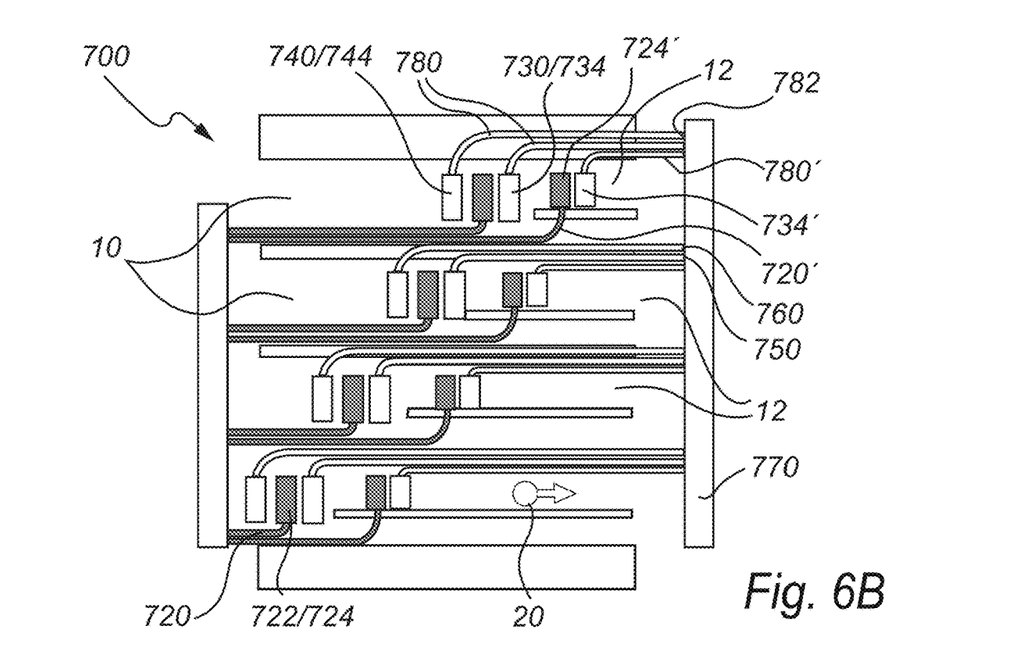
FIG. 6B schematically illustrates a top view of four flow channels of a micro-fluidic system together with a light excitation and collection device further comprising a verification point.

FIG. 6B schematically illustrates a top view of four flow channels 10 of a micro-fluidic system together with a light excitation and collection device 700.

The light excitation and collection device 700 comprises the components and features just described for the light excitation and collection device 600 in relation to FIG. 6A. For sample sorting applications, the measurement of the forward and side scattered light may result in triggering a rerouting of the flow of the sample 20 to another sub-channel 12. By way of example, such rerouting may be based on size, shape or type of the sample 20. In order to verify that the sorting was performed successfully, the sub-channel 12 in the present embodiment is provided with a second set for excitation and collection. A verification excitation waveguide 720' and a verification excitation grating coupler 724' provide excitation light to the sub-channel 12. The excitation light is elastically scattered when a sample passes through the sub-channel 12 and in the present embodiment a verification collection grating coupler 734' couples forward scattered light into a verification collection waveguide 780'. Alternatively, the side scattered light may be used for the verification. As another alternative, both the forward scattered light and the side scattered light may be used for the verification.

It should be understood that, although the sample sorting and verification is illustrated as a light excitation and collection device 700, being based on the light excitation and collection device 600, it is conceivable to a person skilled in the art that also other embodiments allow such addition of sorting and verification.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A light excitation and collection device for a microfluidic system, comprising:
   a light source configured to generate excitation light;
   a plurality of excitation waveguides, wherein each excitation waveguide of the plurality of excitation waveguides is associated with a flow channel of a plurality of flow channels of the micro-fluidic system, and wherein the plurality of excitation waveguides are arranged in an excitation waveguide plane and the plurality of flow channels are arranged in a flow channel plane, the excitation waveguide plane and the flow channel plane being parallel;

wherein each excitation waveguide of the plurality of excitation waveguides is configured to receive the excitation light from the light source, to guide the excitation light in the excitation waveguide plane, and at an output of the excitation waveguide to redirect the excitation light towards the flow channel associated with the excitation waveguide, such that the excitation light is elastically scattered by a sample in the flow channel forming forward scattered light and side scattered light;

at least one forward scattered light collection point associated with each of the plurality of excitation waveguides, at which forward scattered light collection point at least part of the forward scattered light is collected;

at least one side scattered light collection point associated with each of the plurality of excitation waveguides, at which side scattered light collection point at least part of the side scattered light is collected, wherein the forward scattered light collected at the forward scattered light collection point for all excitation waveguides of the plurality of excitation waveguides is detected by a first plurality of light sensitive areas and the side scattered light collected at the side scattered light collection point for all excitation waveguides of the plurality of excitation waveguides is detected by a second plurality of light sensitive areas, the first plurality of light sensitive areas and the second plurality of light sensitive areas form different groups of light sensitive areas;

the first plurality of light sensitive areas and the second plurality of light sensitive areas, wherein at least one of the first plurality of light sensitive areas and the second plurality of light sensitive areas are arranged in a detector array; and a plurality of collection waveguides, wherein each collection waveguide of the plurality of collection waveguides is associated with a flow channel of the plurality of flow channels of the micro-fluidic system, and wherein the plurality of collection waveguides are arranged in a collection waveguide plane being parallel to the flow channel plane, wherein each collection waveguide of the plurality of collection waveguides is configured to receive light collected at at least one of the forward scattered light collection point or the side scattered light collection point, to guide the collected light in the collection waveguide plane, and at an output of the collection waveguide direct the light towards the detector array, and wherein the forward scattered light collection point comprises a forward scattered collection grating coupler, and wherein the forward scattered collection grating coupler is arranged to redirect the forward scattered light such that the forward scattered light is guided in the collection waveguide plane in a direction towards the detector array, and wherein the side scattered light collection point comprises a side scattered collection grating coupler, and wherein the side scattered collection grating coupler is arranged to redirect the side scattered light such that the side scattered light is guided in the collection waveguide plane in a direction towards the detector array.

2. The light excitation and collection device according to claim 1, wherein one or more excitation waveguides of the plurality of excitation waveguides comprise an excitation grating coupler, and wherein the excitation grating coupler is arranged to redirect the excitation light, at the output of the excitation waveguide, towards the flow channel associated with the excitation waveguide.

3. The light excitation and collection device according to claim 1, wherein the detector array is arranged on an opposite side of the flow channel, in relation to the excitation waveguide plane.

4. The light excitation and collection device according to claim 1, wherein the output of the collection waveguide is arranged at an edge of the collection waveguide, and wherein the detector array is arranged at the edge of the collection waveguide to detect the light.

5. The light excitation and collection device according to claim 1, wherein the excitation waveguide plane and the collection waveguide plane are arranged on a common substrate to form an opto-fluidic device, the opto-fluidic device further comprising the plurality of flow channels, and wherein the light source and the detector array are arranged externally to the opto-fluidic device.

6. The light excitation and collection device according to claim 1, wherein the excitation light from the light source is distributed to different excitation waveguides by means of a plurality of beam splitters.

7. The light excitation and collection device according to claim 1, wherein a blocking layer is arranged in a surface facing the flow channel in locations other than the locations at which the forward scattered light collection point and the side scattered light collection point are located, such that the blocking layer blocks light impinging on the surface with an undesired angle of incidence.

8. The light excitation and collection device according to claim 1, wherein an interference filter is arranged in a surface facing the flow channel, such that the interference filter selectively reflects, towards at least one of the forward scattered light collection point or the side scattered light collection point, light impinging on the surface with a desired angle of incidence.

9. The light excitation and collection device according to claim 1, wherein the first plurality of light sensitive areas and the second plurality of light sensitive areas are arranged in a detector array.

10. A micro-fluidic system comprising at least one light excitation and collection device according to claim 1.

11. A method for light excitation and collection for the micro-fluidic system according to claim 1, the method comprising:
generating excitation light with the light source;
receiving the excitation light from the light source at each of the plurality of excitation waveguides;
guiding the excitation light in the excitation waveguide plane;
redirecting, at the output of the excitation waveguide, the excitation light towards the flow channel associated with the excitation waveguide, such that the excitation light is elastically scattered by a sample in the flow channel forming forward scattered light and side scattered light;

collecting at least part of the forward scattered light, at the at least one forward scattered light collection point associated with each of the plurality of excitation waveguides;

collecting at least part of the side scattered light, at the at least one side scattered light collection point associated with each of the plurality of excitation waveguides;

detecting, by the first plurality of light sensitive areas, the forward scattered light collected at the forward scattered light collection point for all excitation waveguides of the plurality of excitation waveguides; and detecting, by the second plurality of light sensitive areas, the side scattered light collected at the side scattered light collection point for all excitation waveguides of the plurality of excitation waveguides.

* * * * *